(12) United States Patent
Wett et al.

(10) Patent No.: US 9,340,439 B2
(45) Date of Patent: May 17, 2016

(54) METHOD AND APPARATUS FOR NITROGEN REMOVAL IN WASTEWATER TREATMENT

(71) Applicants: D.C. Water & Sewer Authority, Washington, DC (US); Hampton Roads Sanitation District, Virginia Beach, VA (US)

(72) Inventors: Bernhard Wett, Innsbruck (AT); Ahmed Omari, Washington, DC (US); Pusker Regmi, Virginia Beach, VA (US); Mark Miller, Virginia Beach, VA (US); Charles B. Bott, Virginia Beach, VA (US); Sudhir N. Murthy, Washington, DC (US)

(73) Assignees: D.C. Water & Sewer Authority, Washington, DC (US); Hampton Roads Sanitation District, Virginia Beach, VA (US)

( * ) Notice: Subject to any disclaimer, the term of this patent is extended or adjusted under 35 U.S.C. 154(b) by 243 days.

(21) Appl. No.: 14/026,339

(22) Filed: Sep. 13, 2013

(65) Prior Publication Data

US 2014/0069863 A1 Mar. 13, 2014

Related U.S. Application Data

(60) Provisional application No. 61/700,717, filed on Sep. 13, 2012.

(51) Int. Cl.
*C02F 3/30* (2006.01)
*C02F 3/00* (2006.01)
*C02F 3/34* (2006.01)

(52) U.S. Cl.
CPC .................. *C02F 3/303* (2013.01); *C02F 3/006* (2013.01); *C02F 3/305* (2013.01); *C02F 3/307* (2013.01); *C02F 3/348* (2013.01); *C02F 2209/14* (2013.01); *C02F 2209/22* (2013.01)

(58) Field of Classification Search
CPC .......... C02F 3/303; C02F 3/305; C02F 3/307; C02F 3/006; C02F 3/348; C02F 2209/14; C02F 2209/22
USPC ......... 210/605, 621, 622, 623, 630, 903, 252, 210/259, 614
See application file for complete search history.

(56) References Cited

U.S. PATENT DOCUMENTS 6,485,646 B1 11/2002 Dijkman et al.
6,592,762 B2 7/2003 Smith
(Continued)

FOREIGN PATENT DOCUMENTS

WO WO 98/30504 A1 7/1998
WO WO 2012/112679 A2 8/2012

OTHER PUBLICATIONS

Bernet, Nicolas, et al., "Nitrification at Low Oxygen Concentration in Biofilm Reactor", Journal of environmental engineering, vol. 127, No. 3 (Mar. 2001): pp. 266-271.
(Continued)

*Primary Examiner* — Fred Prince
(74) *Attorney, Agent, or Firm* — Blank Rome LLP

(57) ABSTRACT

A reactor and control method thereof for nitrogen removal in wastewater treatment achieves a measured control of maintaining high ammonia oxidizing bacteria (AOB) oxidation rates while achieving nitrite oxidizing bacteria (NOB) repression, using various control strategies, including: 1) ammonia and the use of ammonia setpoints, 2) operational DO and the proper use of DO setpoints, 3) bioaugmentation of a lighter flocculant AOB fraction, and 4) proper implementation of transient anoxia within a wide range of reactor configurations and operating conditions.

12 Claims, 10 Drawing Sheets

(56) References Cited

U.S. PATENT DOCUMENTS

| | | |
|---|---|---|
| 7,404,897 B2 | 7/2008 | Bailey, Jr. et al. |
| 7,416,669 B1 * | 8/2008 | Carolan et al. ............... 210/614 |
| 7,846,334 B2 | 12/2010 | Wett |
| 7,862,722 B2 | 1/2011 | Moon |
| 8,268,173 B2 * | 9/2012 | Bundgaard et al. ........... 210/614 |
| 2006/0000769 A1 * | 1/2006 | Miklos ........................ 210/605 |
| 2010/0193431 A1 | 8/2010 | Ikuta et al. |
| 2011/0180476 A1 | 7/2011 | Vanotti et al. |
| 2011/0284461 A1 | 11/2011 | DiMassimo et al. |
| 2013/0020257 A1 * | 1/2013 | McCarty ...................... 210/614 |
| 2013/0264280 A1 * | 10/2013 | Zhao et al. ................... 210/605 |

OTHER PUBLICATIONS

Written Opinion of Application No. 11201501891T, Intellectual Property Office of Singapore, dated Dec. 16, 2015.

\* cited by examiner

METHOD AND APPARATUS FOR NITROGEN REMOVAL IN WASTEWATER TREATMENT

This application claims the benefit of U.S. Provisional Application No. 61/700,717, filed Sep. 13, 2012. The entire disclosure of U.S. Provisional Application No. 61/700,717 is incorporated herein by reference.

BACKGROUND

The inhibition of nitrite oxidizing bacteria (NOB) is a precondition for the implementation of short-cut biological nitrogen removal (ScBNR) processes such as nitritation-denitritation (Ciudad et al., 2005; Gee and Kim, 2004; Ju et al., 2007; Yoo et al., 1999; Yu et al., 2000; Zeng et al., 2008), nitrite-shunt and partial nitritation-anammox (Fux et al., 2002; Hippen et al., 1997; van Dongen et al., 2001; Wett, 2006; Wett, 2007; Wett et al., 2010), and deammonification. Successful repression of nitrite oxidation by controlling NOB saves 25% oxygen and 40% organic carbon compared to conventional nitrification-denitrification (Turk and Mavinic, 1986; Abeling and Seyfried, 1992). In deammonification processes, the control of NOB results in added benefits in further reductions in aeration energy required, and reduced costs of electron donor and solids handling. FIG. 1, FIG. 2 and FIG. 3 show flowcharts for nitrogen removal through conventional nitrification/denitrification, nitritation/denitritation and deammonification (partial nitritation+anaerobic ammonia oxidation), respectively.

In view of high cost of biological nutrient removal (BNR) to meet increasingly stringent effluent standards, ScBNR through repression of NOB is a topic of interest. Efforts to understand NOB repression have been discussed in many publications, including those that are more specific to the use of high temperature (Helling a et al., 1998), high levels of free ammonia inhibition, or dissolved oxygen (DO) concentration (Blackburne et al., 2008) and transient anoxia (Kornaros and Dokianakis, 2010). Particularly, all of these conditions are used in part or as a whole, in various approaches, with success in controlling NOB in systems treating 'high strength' (high free ammonia) waste streams, such as anaerobic digester dewatering liquor (also usually at high temperature) and landfill leachate. Control of NOB repression in low strength waste streams such as domestic wastewater remains a challenge and is the subject of this invention. The status quo associated with the above features and the controls developed for this invention are described below.

Temperature and Ammonia:

Both temperature and free ammonia are features believed to provide an advantage to ammonia oxidizing bacteria (AOB) over NOB. Free ammonia (FA) inhibition of NOB has been well-documented in literature ever since it was considered by Anthonisen et al. (1976). However, knowledge of controlling FA inhibition to obtain stable nitritation is more limited since NOB adaptation has been reported (Turk and Mavinic, 1989; Wong-Chong and Loehr, 1978). Further, high temperature is known to favor growth of AOB over NOB (Kim et al., 2008).

The increased activity of AOB compared to NOB at higher temperature, greater disassociation of total ammonia to free ammonia and resulting NOB inhibition at higher temperatures, combined with low DO operation (often conducted using intermittent aeration and with managed aerobic solids retention time (SRT)), results in enrichment of AOB and selective wash out of NOB. These approaches are variously described (EP 0826639 A1, EP 0872451 B1, US 2010/0233777 A1, U.S. Pat. No. 7,846,334 B2, U.S. Pat. No. 6,485,646 B1, WO 2012/052443 A1) to control NOB in 'high strength' wastewater. These methods either use suspended growth (WO 2006/129132 A1), attached growth on the support media (US 2011/0253625 A1, EP 0931768 B1) or granular sludge (Wett, 2007; U.S. Pat. No. 7,846,334 B2) to accomplish ScBNR.

In spite of being effective, the role of elevated temperature to increase activity of AOB and for the control of NOB growth is not feasible in low strength mainstream processes operating under wide range of temperatures. Consequently, NOB control in low strength wastewater remains intractable and requires careful manipulation of factors other than temperature or free ammonia.

Dissolved Oxygen:

Dissolved oxygen (DO) can play a significant role in control of NOB in low strength wastewater. Sustained nitritation with the use of low DO concentration has been observed in a variety of reactor configurations (Sliekers et al., 2005; Wyffels et al., 2004; Blackburne et al., 2008). Although, all of these reports lack account of underlying mechanisms, they resort to a hypothesis of higher oxygen affinity of AOB compared to the NOB (Hanaki et al., 1990; Laanbroek and Gerards, 1993; Bernet et al., 2001) as an explanation for the observed phenomenon (Yoo et al., 1999; Peng et al., 2007; Lemaire et al., 2008; Gao et al., 2009; Zeng et al., 2009). Although the hypothesis that low-DO operation favors AOB versus NOB is very widespread (see review of oxygen half-saturation parameters in Sin et al., 2008) some research results point in the opposite direction (Daebel et al., 2007; Manser et al., 2005) and also inventors' data (see FIG. 4 and FIG. 5) indicates stronger adaptation to low DO-concentration for NOB compared to AOB.

Bioaugmentation:

The transfer of nitrifying biomass from a high strength reactor to the low strength mainstream reactor, such that the SRT required to perform nitrification is decreased in the mainstream process has been reported before (U.S. Pat. No. 7,404,897 B2, U.S. Pat. No. 6,602,417 B1). This bioaugmentation can occur from a separate sidestream reactor or a reactor co-joined with the mainstream reactor (Parker and Warmer, 2007). There is also existing prior art related to the physical separation of a more dense biomass fraction containing predominantly anammox organisms and recycling this heavier fraction by the use of the hydrocyclone in order to enrich this very slowly growing biomass (EP 216352481, US 2011/0198284 A1).

Transient Anoxia:

The use of transient anoxia has been a common approach to achieve NOB repression (Li et al., 2012; Ling, 2009; Pollice et al., 2002; Rosenwinkel et al., 2005; Zekker et al., 2012; U.S. Pat. No. 7,846,334 B2; EP 0872451 B1; WO 2006/129132 A1). Transient anoxia allows for a measured approach to control the aerobic SRT as well as to introduce a lag-time for NOB to transition from the anoxic to aerobic environment. Kornaros and Dokianakis (2010) showed delay in NOB recovery and NOB lag adaptation in aerobic conditions following transient anoxia, thus confirming the observations of the usefulness of transient anoxia by many others (Allenman and Irvine, 1980; Katsogiannis et al., 2003; Sedlak, 1991; Silverstein and Schroeder, 1983; Yang and Yang, 2011; Yoo et al., 1999). Although transient anoxia has been used successfully to control NOB in 'high strength' wastes (Wett, 2007; U.S. Pat. No. 7,846,334 B2) and the ability to use it in low strength wastes has been suggested (Peng et al., 2004), the ability to control the features associated with transient anoxia remains an enigma until this invention.

To summarize, there exists a need for clear control strategies that exploit the underlying mechanisms of maintaining high AOB oxidation rates while achieving NOB repression with 1) ammonia and the use of ammonia setpoints, 2) operational DO and the proper use of DO setpoints, 3) bioaugmentation of a lighter flocculant AOB fraction, and 4) proper implementation of transient anoxia within a wide range of apparatus (reactor configurations) and operating conditions.

SUMMARY OF THE INVENTION

The claimed invention achieves a proper and measured control of maintaining high AOB oxidation rates while achieving NOB repression, using various control strategies, including: 1) ammonia and the use of ammonia setpoints, 2) operational DO and the proper use of DO setpoints, 3) bio-augmentation of a lighter flocculant AOB fraction, and 4) proper implementation of transient anoxia within a wide range of apparatus (reactor configurations) and operating conditions.

DETAILED DESCRIPTION

Figure 1:
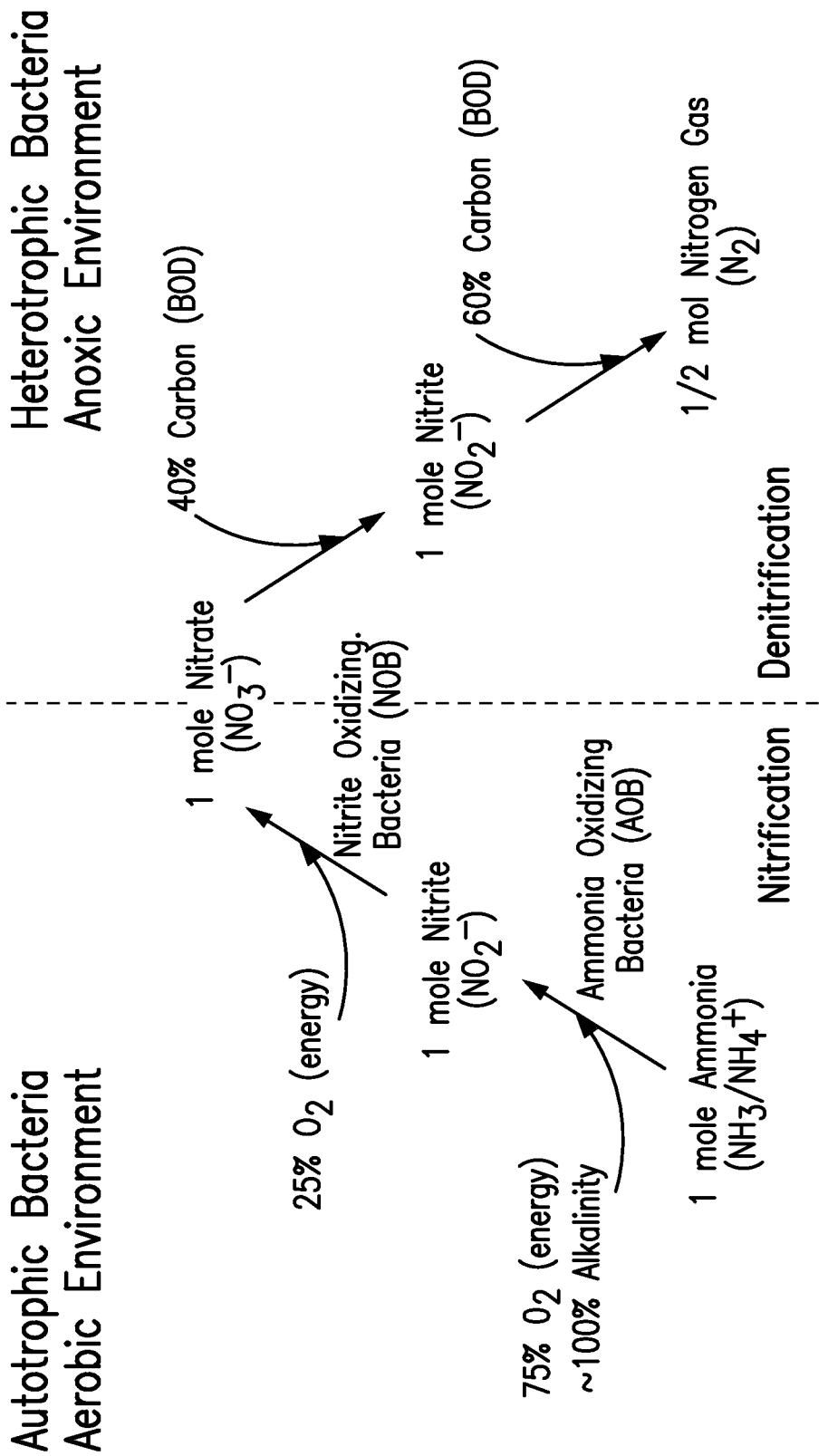
FIG. 1 is a molar flowchart showing the reactions associated with conventional nitrification and denitrification.
Figure 2:
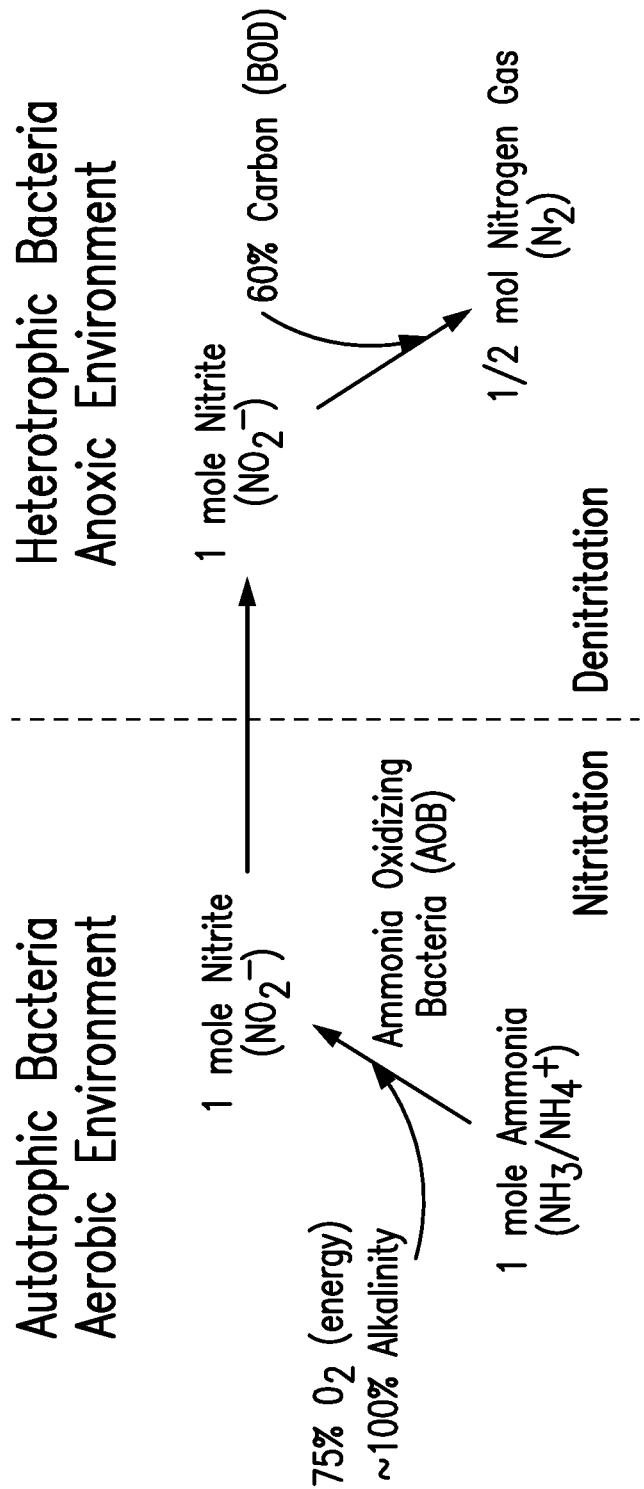
FIG. 2 is a molar flowchart showing the reactions associated with nitritation and denitritation.
Figure 3:
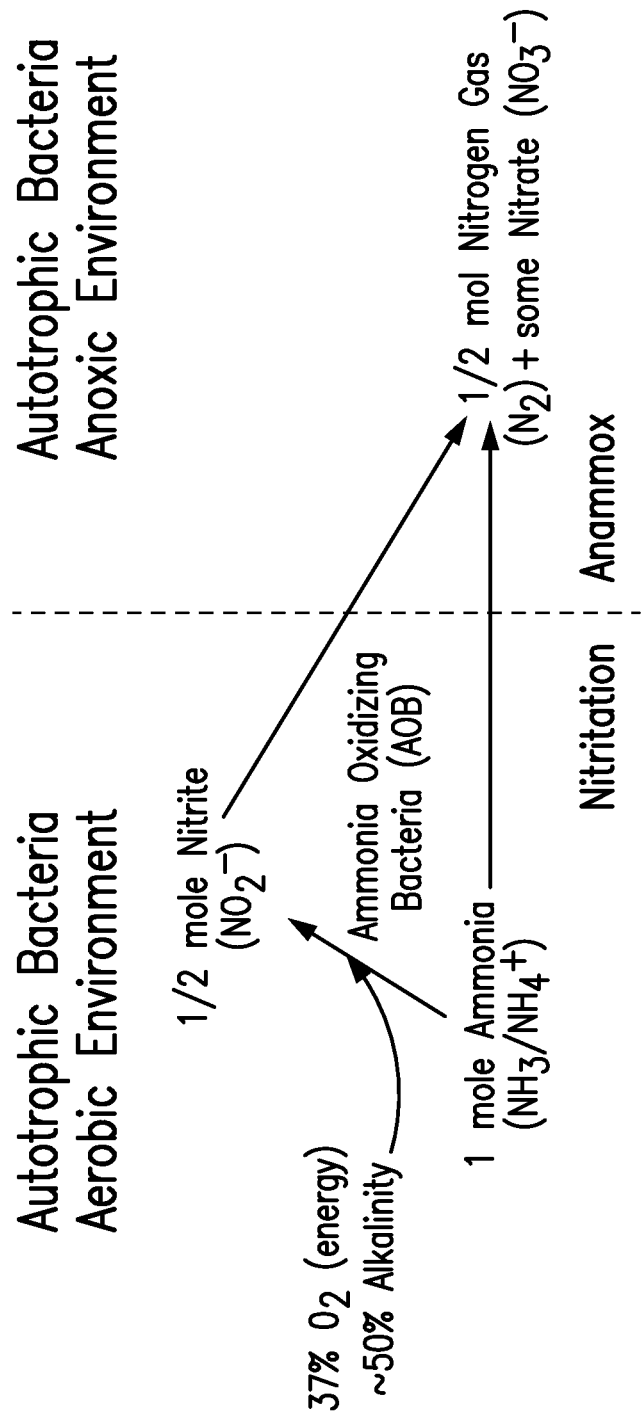
FIG. 3 is a molar flowchart showing reactions associated with deammonification.
Figure 4:
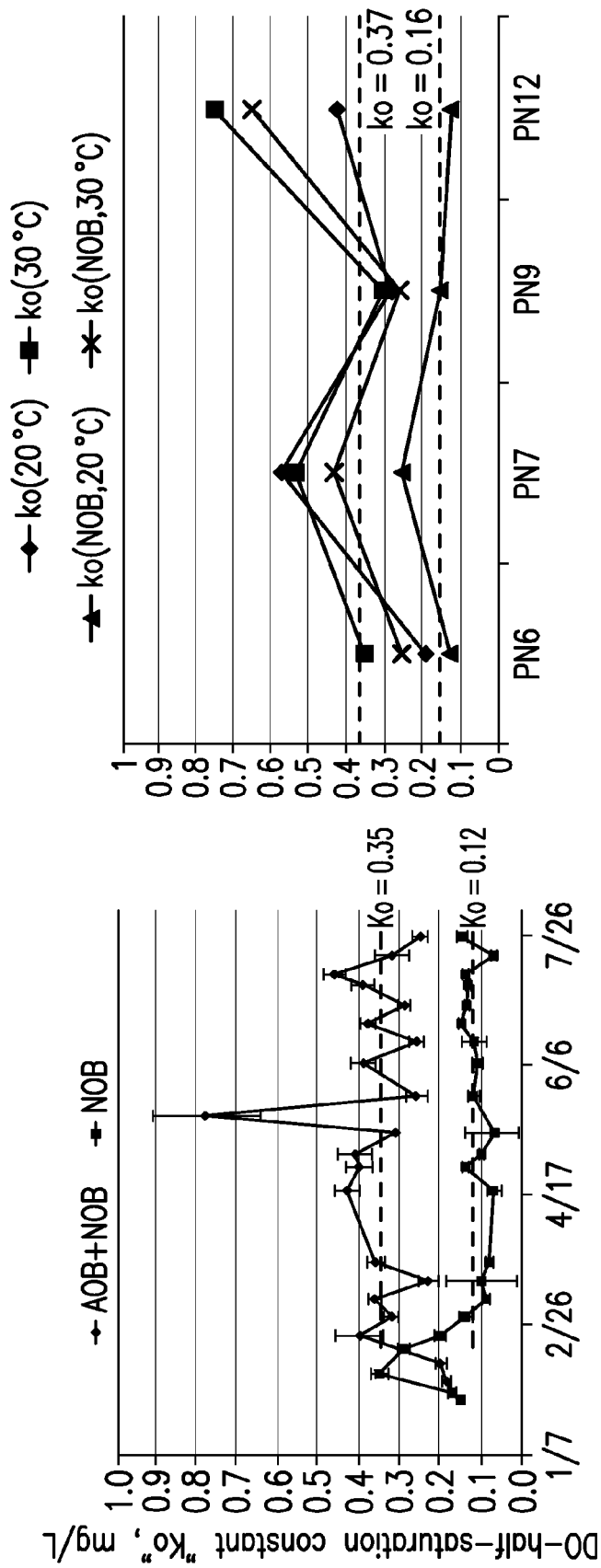
FIG. 4 is a line graph comparing collected data of KO-values of total nitrifiers (AOB+NOB) and NOB only in bench-scale batch-reactors at Blue Plains Waste Water Treatment Plant (WWTP) (left) and in full-scale at Strass WWTP (right).
Figure 5:
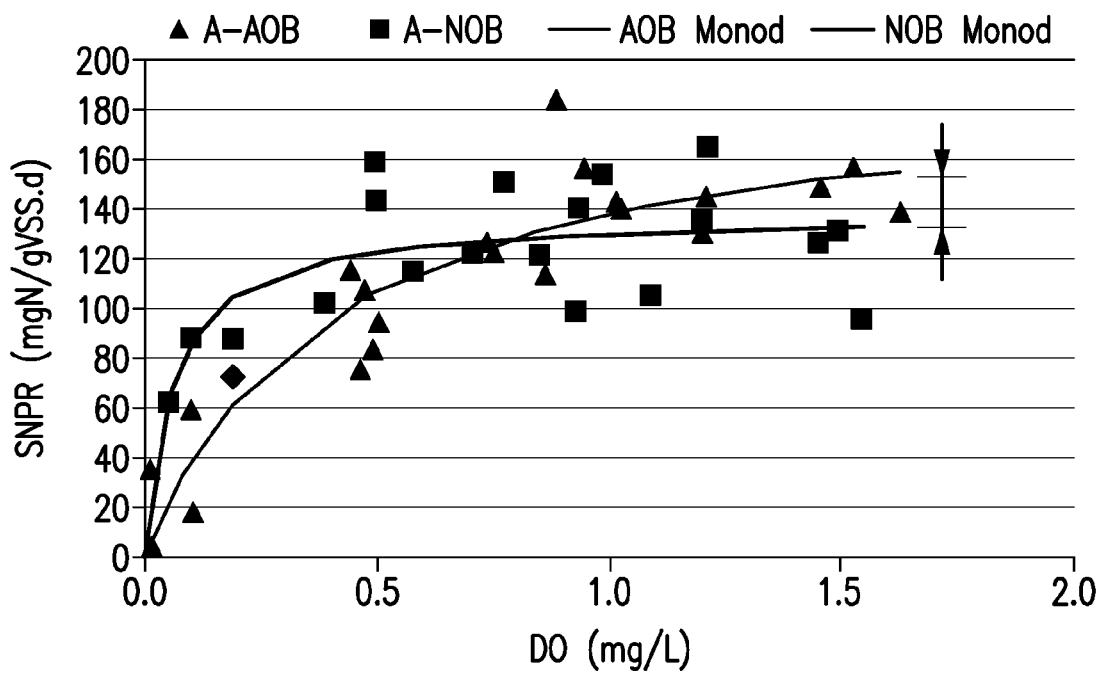
FIG. 5 is a graph (left) showing plotted test data of specific nitrogen process rates in terms of ammonia removal per g VSS and day depending on the DO-setpoint of the intermittent aeration of the batch reactors; Monod expressions (right) are fitted to the measured data by applying least square error minimization (the arrow indicates 15% higher N-processing rates of AOB at a DO-level of 1.5 mg/L).

The present invention develops approaches to increase AOB oxidation rates and to repress and control NOB through ammonia, DO, bioaugmentation and transient anoxia control. The proposed inventions associated with these four features (as compared to the status quo previously described) and the controls developed for this invention are described below.

Temperature and Ammonia:

The current invention shifts away from the more typical use of temperature and free ammonia to achieve NOB repression. The use of temperature to control relative growth rates of AOB and NOB is not always possible within mainstream processes. It is proposed by the inventors that a control feature can be developed that uses the direct measurement of ammonia itself as a controlling variable instead of free ammonia and temperature. The invention uses direct control of the extent of ammonia oxidation, such that ammonia is oxidized throughout a specified reactor time cycle or a specific reactor length. Allowing residual ammonia will maintain pressure on NOB by maintaining high AOB rates.

Dissolved Oxygen:

While the papers discussed in the background section proposed the differences in affinities (e.g., stronger adaptation to low DO-concentration for NOB compared to AOB), the opportunities to employ these differences in a control scheme were discovered by the present inventors. Thus surprisingly and contrary to previous interpretations, transiently high DO operation appears more appropriate to out-compete NOB. The case for using higher DO levels is a differentiator in this invention from the prior art. The higher DO not only maintains high AOB rates, but also manages the relative substrate affinities of AOB and NOB towards NOB repression.

Bioaugmentation:

Different from the prior art approach discussed in the background section, which aims to select the heavier biomass fraction, the current invention aims to select the lighter biomass fraction (e.g., the overflow instead of the underflow of the hydrocyclone) containing predominantly AOB, in order to bioaugment the relatively fast growing AOB from the sidestream reactor to the mainstream, without uncontrolled loss of anammox activity in the sidestream reactor. The selection of the lighter biomass fraction using a cyclone, or sieve, or the unattached biomass separated from a biofilm carrier media in the case of a moving bed biofilm reactor (MBBR) or integrated fixed-film activated sludge (IFAS) reactor, allows a maximum seeding rate which helps to repress NOB in both the high-strength reactor (selectively decreasing SRT) and the low-strength system (transfer of AOB but almost no NOB).

Transient Anoxia:

The case for rapid transition from a high DO into anoxia is another subject of this invention. Rapid transitions to anoxia not only allow little space for NOB to grow, rapid transitions from anoxia back to a high DO set point also allow for the inhibition of the growth of NOB. The transition from anoxia can also produce intermediates that are inhibitory to NOB. It is by nature that nitrite oxidation follows ammonia oxidation. Most models use a substrate half saturation based on the Monod equation (Monod, 1949) to describe the ability to use both the electron donor and acceptor. In a rapidly changing DO environment, some nitrite is likely to accumulate towards the end of ammonia oxidation based on substrate half saturation associated with NOB and the need for available nitrite prior to substantial NOB metabolism. In that situation, if the aeration is continued, the residual nitrite will eventually be converted to nitrate by NOB; however, if aeration is discontinued and the conditions are allowed to rapidly transition to anoxia, the remaining nitrite will be 'anoxically' reduced by either chemical oxygen demand (COD) driven heterotrophic denitrifiers in nitrite-shunt processes or by anammox in a single stage deammonification processes. Hence, nitrite-reducing bacteria (e.g., heterotrophic denitrifiers or anammox) may out-compete the NOB (by consuming nitrite), thereby creating pressure on NOB by limiting the availability of their substrate. The NOB population will gain less and less energy in every subsequent cycle, further reducing the active population thereof. Therefore, it is critical to restrict aeration and to rapidly transition to anoxia at the end of ammonia oxidation such that NOB are deprived of DO when nitrite is available.

Figure 6:
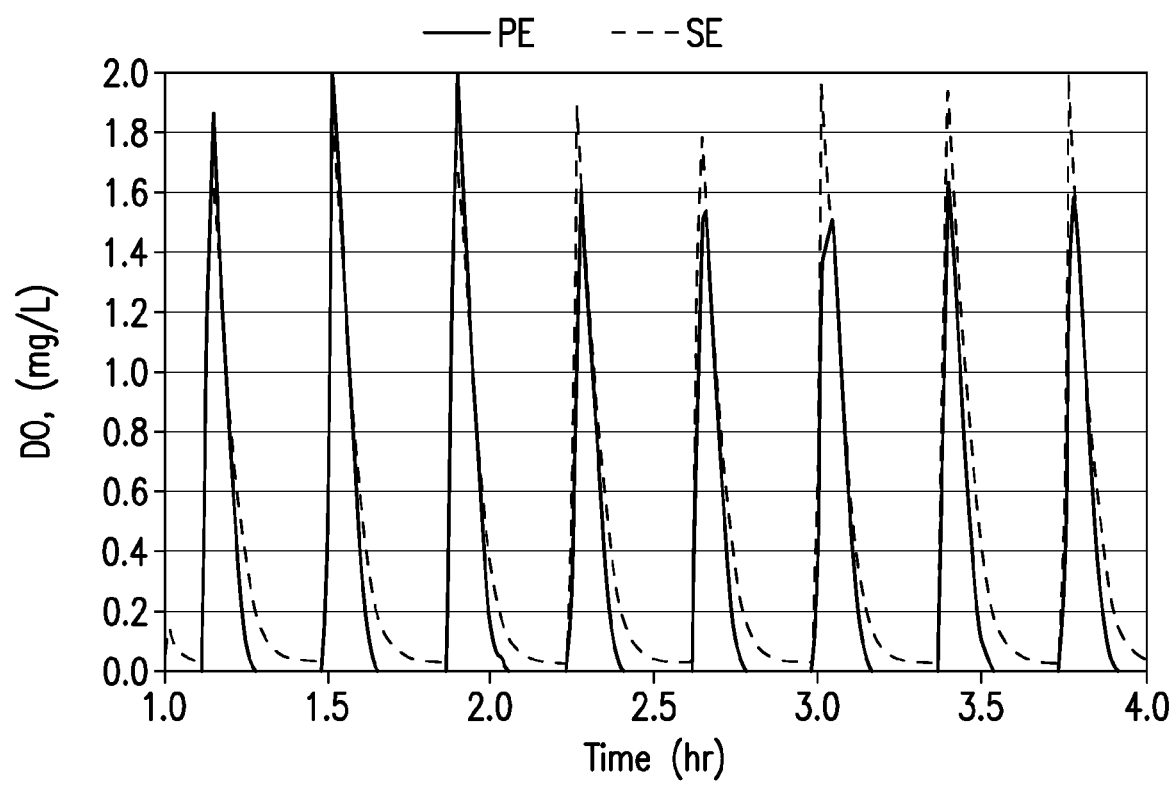
FIG. 6 is a temporal graph comparison of DO depletion curves between two identical SBRs operated with the same aeration regime, one being fed with primary treated effluent (PE) and the other with secondary treated effluent (SE). Note the higher chemical oxygen demand (COD) in the PE fed system allow for more rapid transitions to anoxia from high DO setting.
Figure 7:
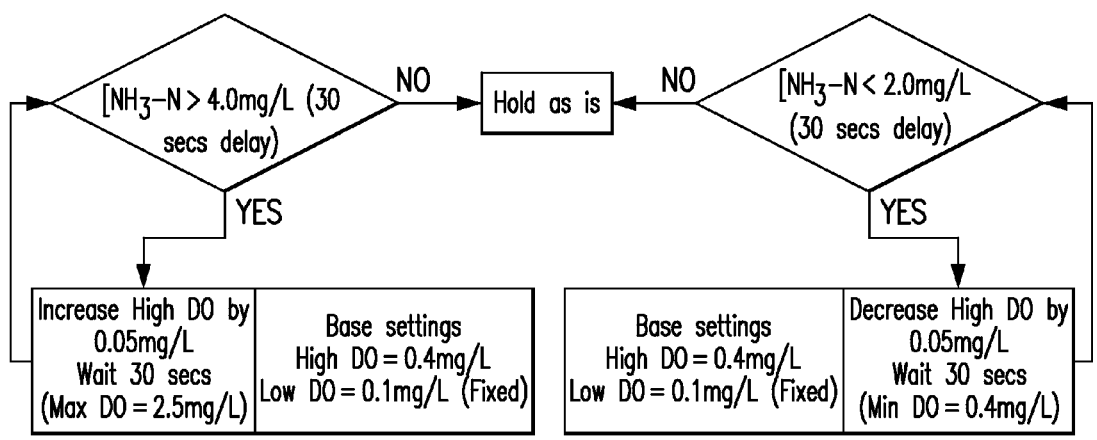
FIG. 7 is a flowchart showing a DO control algorithm based on ammonia and DO concentrations.
Figure 8:
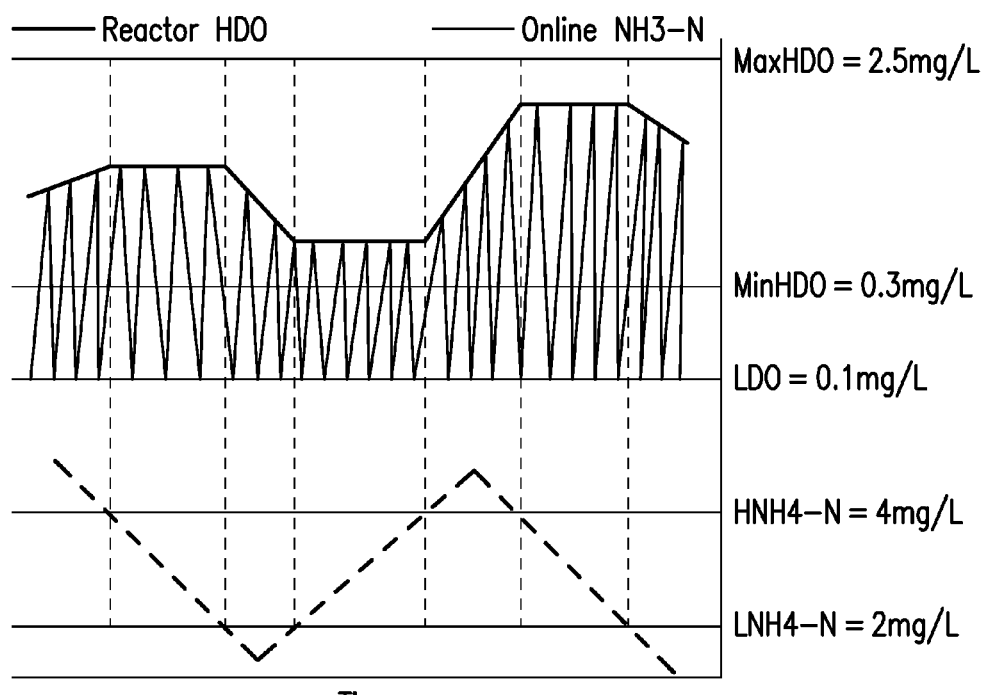
FIG. 8 is a comparison graph showing an illustration of implementation of transient anoxia logic with representative setpoints and control parameters.
Figure 9:
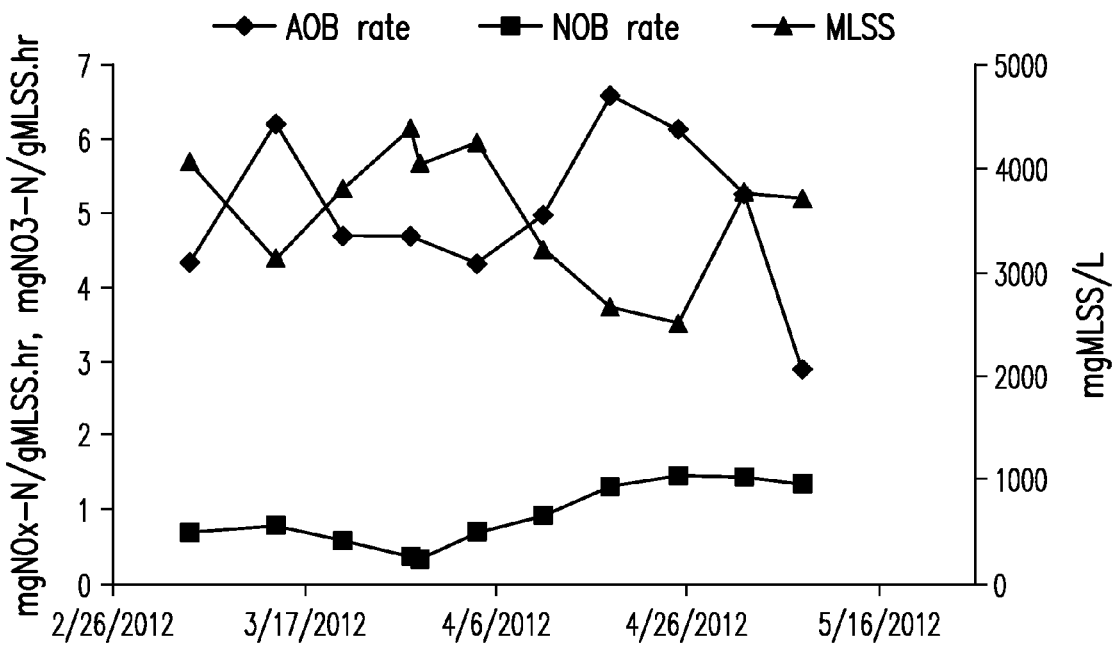
FIG. 9 is a graph comparing ammonia oxidation rates and nitrite oxidation rates in a reactor operated under strategy described in Plug Flow and completely mixed Process (Aeration Time Control).
Figure 10:
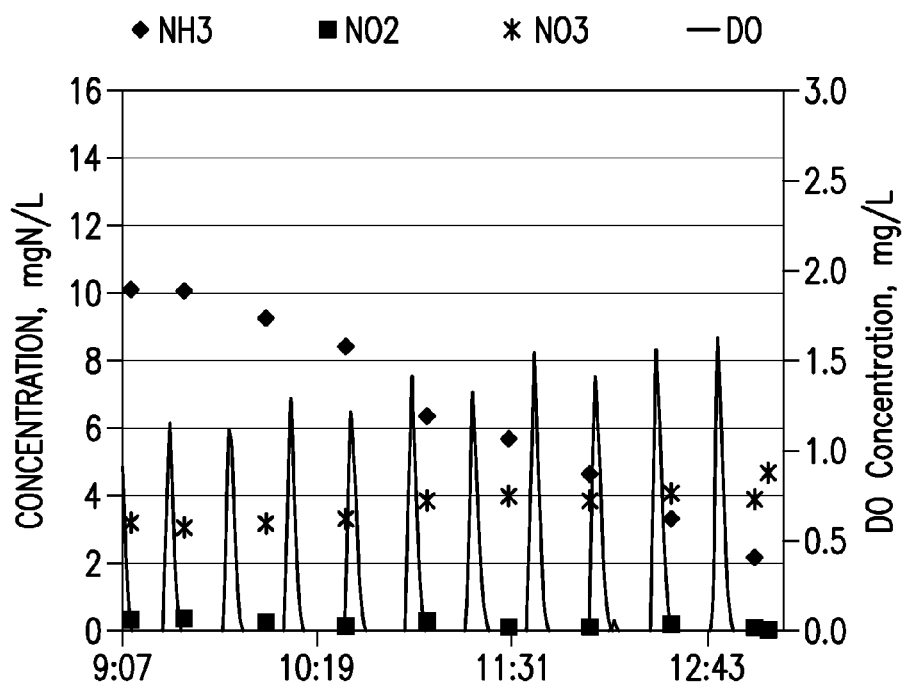
FIG. 10 is a graph comparing Nitrogen species ($NH_3$, $NO_2$ and $NO_3$) profiles during reaction phase in SBR configuration operated with intermittent aeration [residual ammonia].
Figure 11:
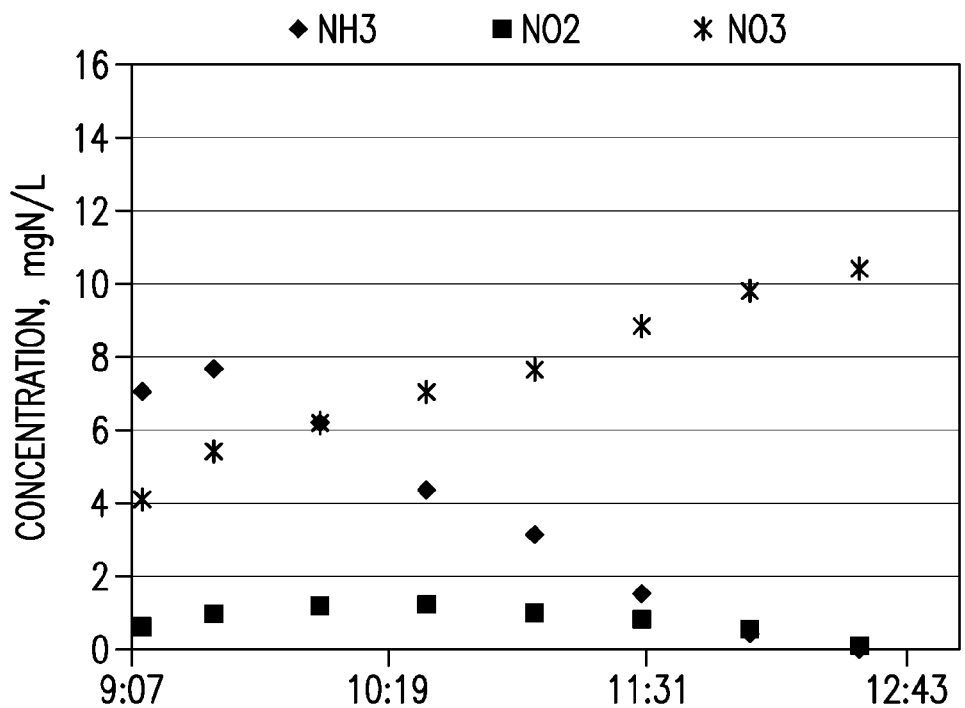
FIG. 11 is a graph comparing Nitrogen species ($NH_3$, $NO_2$ and $NO_3$) profiles during reaction phase in SBR configuration operated with intermittent aeration [no residual ammonia].

In the invention, rapid transitions to anoxia are allowed for by maintaining higher oxygen uptake rates through an increase in mixed liquor solids concentration, or by introducing COD in the anoxic phase to rapidly scavenge oxygen. FIG. 6 shows an example of this comparing the DO profiles for two SBR systems operated in intermittent aeration mode where one was fed a primary treated effluent and the other was fed secondary treated effluent. Second, the invention directly measures ammonia in concert with a DO and Anoxic(A)-Oxic(O) hydraulic residence time (HRT) control algorithm (see FIG. 7) to achieve a rapidly alternating aerobic and anoxic environment (FIG. 8). Under this strategy, the ammonia is measured and maintained either within certain predetermined ammonia set points or at a single setpoint with appropriate bandwidth, which depends on the hydraulic regime of the reactor. This approach eliminates the concern of over-aerating after the near completion of ammonia oxidation as residual ammonia is always maintained, which further helps to maintain high AOB rates. Hence, the invention is capable of exploiting known NOB repression strategies with use of a robust control algorithm based on direct ammonia and DO signals. FIG. 9 and FIG. 10 demonstrate the performance of this strategy in controlling NOB to achieve ScBNR in a nitrite-shunt system and single stage deammonification system, respectively. FIG. 11 illustrates the negative impact of over aerating (indicated by no residual ammonia) on NOB repression (indicated by nitrate production).

Specific controls for controlling NOB through these four features (ammonia, DO, bioaugmentation and transient anoxia control) are now described.

Dissolved Oxygen Setpoint Control:

It is desirable to maintain a dissolved oxygen (DO) setpoint as much above 1 mg/L as practicable. A higher DO setpoint allows for a more rapid growth of AOB over NOB. However, a very high DO setpoint increases the time-to-transition to anoxia. One approach that has been successfully used for achieving this high DO strategy is described in the control narrative below. It should be noted that this high DO strategy is in opposition to the conventional wisdom of achieving nitrite shunt for low strength and to the actual practice of achieving nitrite shunt in high strength and high temperature waste streams.

Ammonia Setpoint Control:

The aerobic SRT is controlled through two approaches. An increase in solids wasted decreases the total and aerobic SRT. A second approach to decreasing the aerobic SRT is by increasing the anoxic time step during transient anoxia. In an intermittently aerated (in time or space) BNR reactor operated under ammonia-based DO control (in time)/A-O HRT control (in space) strategy, aerobic SRT is determined by aeration needs of AOB to oxidize ammonia to meet the imposed ammonia set points. For example, if AOB's ammonia oxidation rate is lower, more aeration will be required to meet the same ammonia set point compared to when AOB rates are higher. In such a scenario, intentional lowering of the total SRT gradually results in a reduction in AOB ammonia oxidation rate at a certain DO value. Consequently, AOB require more aeration to increase their growth rate and to meet the desired ammonia set point, causing the operational high DO set point (in case of ammonia-based DO control) and aerobic HRT (in case of ammonia-based A-O HRT control) to increase and be at a point where the growth of AOB are favored over NOB.

Current systems that attempt to achieve nitrite shunt do not operate at aggressive aerobic SRTs and therefore are unable to achieve suitable conditions for NOB repression. The invention's desire for operating at a high DO setpoint allows for a more aggressive SRT operation strategy, which while maintaining high AOB oxidation rates, supplies additional pressure for NOB repression. The bioaugmentation of AOB from a sidestream reactor or an upstream stage will allow aerobic SRT to be even lower, which can cause selective wash out of NOB. In addition, the application of aggressive SRT pressure is easily controlled in this invention. Since the ammonium setpoint determines the operational high DO setpoint (in case of ammonia-based DO control) and aerated fraction (in case of ammonia-based A-O HRT control), our work has suggested that it is a simple matter to control the total SRT such that the DO remains at a high concentration, in excess of 1 mg/L.

Bioaugmentation:

Bioaugmentation of AOB from a sidestream process via a selection device to the mainstream results in enrichment of AOB and allows aggressive control of SRT to washout NOB while meeting ammonia oxidation needs. In a similar manner, bioaugmentation of anammox organisms via a selection device from a sidestream or high strength reactor is also possible.

Transition to Anoxia Control:

A more rapid transition between aerobic setpoint and anoxia is desirable to minimize the time available for NOB to grow favorably over AOB. There are at least three approaches to increase the oxygen uptake rates to transition to anoxia. One approach is to operate the reactor at higher mixed liquor solids concentration, such that there are more organisms seeking air in the same volume (low hydraulic residence time). Another approach is to use influent COD to allow for the scavenging of oxygen during the transition periods. A third approach is to increase the temperature and thus the growth rates of all organisms. The key feature is to allow for high oxygen uptake rates to transition from oxic to anoxic conditions.

Transient Anoxia Frequency (TAF) Control:

It is desirable to have a high TAF to allow for rapid changes between aerobic and anoxic conditions while maintaining the same overall aerobic SRT. For example a 5 minute aerobic/anoxic cycle is preferred over a 15 minute aerobic/anoxic cycle, which is preferred over a 30 minute aerobic/anoxic cycle. A highest practicable TAF allows for disruption of NOB while allowing for preferential growth of AOB in the aerobic phase and denitrifying organisms or anammox organisms in the anoxic phase. There are constraints to maximizing this frequency. The increase in frequency, maximum value, is eventually constrained in the aerobic step by the time required to allow oxygen to achieve its setpoint and then to sufficiently oxidize ammonia. Additionally, a minimum anoxic time is required to allow denitrifying or anammox organisms to convert nitrite to nitrogen gas.

Reactor Configurations:

Several apparatus are available to execute this AOB oxidation and NOB repression framework, including complete mixed reactors, sequencing batch reactors, oxidation ditches and plug flow reactors. It should be noted that the reactor apparatus can be adjusted to deliver the control features for achieving SRT, ammonia oxidation requirements, high DO setting and anoxia transitions, where possible, by providing mechanical and hydraulic flexibility for attaining dissolved oxygen settings and anoxic in space or anoxic in time settings. Selectors used to ensure good settling biomass or biological phosphorus removal and swing zones or reactors to accommodate variable flows and loads that are typical to a wastewater treatment process can be provided. In addition to suspended growth reactors, biofilm, granular or hybrids of these reactors are also feasible. Finally, the solid-liquid separation could occur using any separation device including clarifiers, membranes or dissolved air floatation tanks.

Plug flow reactors are characterized as continuously fed reactors with very high length to width ratio and can be simulated as a series of completely mixed reactors where the pollutant concentration decreases along the flow pathway across the reactors length (i.e. concentration gradient). In plug flow continuously fed reactors, which are more commonly used in large treatment plants, the process controls to achieve ScBNR can be addressed using two configurations: (1) controlling aeration in space by alternating between aerobic and anaerobic zones; and (2) controlling aeration in time by cycling air throughout the reactor in "air on" and "air off" sequence similar to SBR configuration. Other features requiring control of mixed liquor and aerobic/anoxic transitions are similar to SBR scheme described above.

Control Strategies

Several control strategies are available that can be applied in the above-mentioned reactor configurations that make use of features of this invention to achieve NOB repression. A few exemplary strategies are described below, optimized for various configurations.

Control Strategy A:

The first control strategy under which the operational DO is variable and controlled by the ammonia concentration in the BNR reactor will optimize the DO for high ammonia oxidation rate. This approach is valid in a wide range of reactor configurations include plug flow, complete mix, complete mix reactors in series, and sequencing batch reactor. Under this approach the DO cycles between the low DO (which is fixed) and a high variable DO, usually greater than 1 mg/L and controlled by reactor ammonia set points. An aggressive aerobic SRT is maintained to increase the demand for oxygen, thus allowing for the controller to automatically increase the DO levels to greater than 1 mg/L. In this control strategy, the aerobic and anoxic periods are dictated by the AOB's aeration requirement to meet ammonia set point, as opposed to being fixed.

Figure 12:
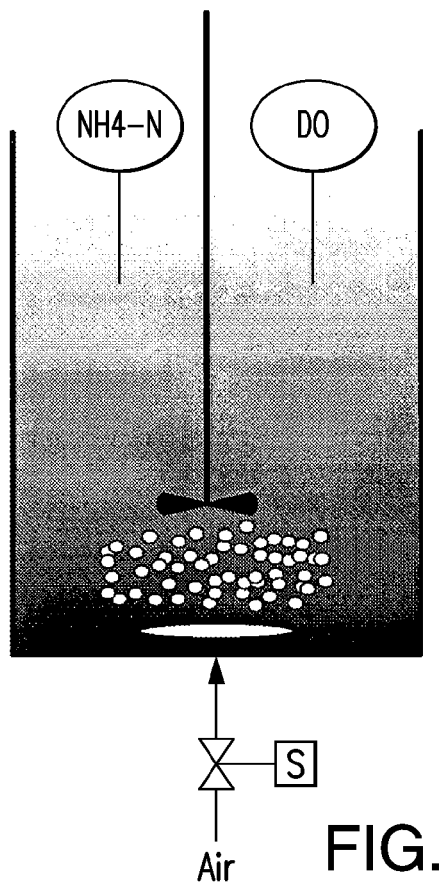
FIG. 12 is a lateral cross-sectional view of a BNR reactor fitted with mechanical mixer, air diffuser, ammonia and DO sensors.

In this exemplary embodiment, a BNR reactor may be fitted with DO and ammonia probe (FIG. 12). It will be possible to have any reactor configuration as described in the next subsection where the control can occur either in time or in space. In case of multiple or plug flow reactors, multiple DO probes are installed along each major section along a train, while an ammonia probe will be installed strategically in a latter reactor or section, to manage reaction rates such that small amounts of ammonia residuals are maintained. The aeration in the aerobic reactors is controlled based on the real time $NH_4$—N concentration in the reactor, which is representative of the effluent $NH_4$—N. The goal is to achieve certain ammonia set points which could be either single set point, a range between a high and low value, or a small bandwidth. A control scheme is discussed below using high and low ammonia setpoints.

Aeration is regulated by switching an air control valve either ON or OFF, based on a high DO (HDO) and low DO (LDO) setpoint. The LDO setpoint is fixed at near zero (0.001 to 0.1 mg/L) whereas HDO is variable (based on $NH_3$—N in the tank) from 0.3 mg/L (MinHDO) to 3.0 mg/L (MaxHDO). The MaxHDO is set at 2.5-3.0 mg/L, since adding more aeration beyond this point is believed to provide no added benefit in terms of ammonia oxidation rate, except in the case of MBBR or IFAS reactor where a higher MaxHDO setpoint may be used as a result of dissolved oxygen mass transfer limitations imposed by these processes. When the $NH_3$—N in tank is greater than the high ammonia-N setpoint ($HNH_3$—N) (1-4 mg/L), the HDO is increased until the $NH_3$—N gets below the 1-4 mg/L $HNH_3$—N setpoint. When the $NH_3$—N concentration is lower than the low ammonia-N setpoint ($LNH_3$—N) (0.5-2 mg/L), the HDO is decreased until the $NH_3$—N concentration gets higher than the 0.5-2 mg/L $LNH_3$—N setpoint (FIG. 7). If the ammonia-N is between the $LNH_3$—N and $HNH_3$—N there will be no change in the HDO setpoint. This scenario will be encountered when $NH_3$—N concentration is going down from the $HNH_3$—N setpoint or going up from the $LNH_3$—N setpoint (FIG. 8). A P, PI, or PID controller adjusting the HDO setpoint based on an $NH_3$—N setpoint with appropriate bandwidth depending on the response time and reactor hydraulics is also possible. Aggressive SRT control is accomplished by wasting solids such that the HDO setpoint is consistently greater than 1 mg/L. The total SRT can also be controlled automatically by maintaining the waste flow rate based on reactor DO concentration over certain averaging time.

Figure 13:
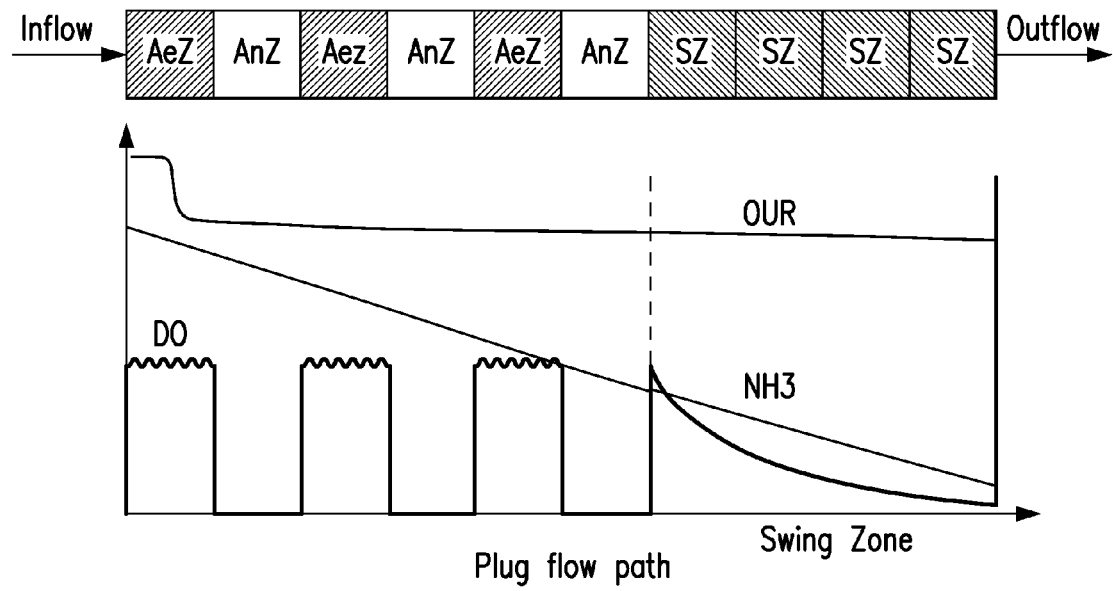
FIG. 13 is a chart showing a plug flow reactor configuration for ScBNR operation using space based aeration control. [AeZ=aerobic zone; AnZ=anaerobic zone; SZ=swing zone].

Control Strategy B:

To simulate the intermittent aeration control in space (FIG. 13), a reactor is designed such that the entire volume could be mechanically mixed and aerated. Deliberately turning the mixer and aerators either ON or OFF controls the aerobic and anoxic HRT within this reactor. Under a first control strategy, in which the operational DO is fixed at greater than 1 mg/L such that AOB growth is favored over NOB, the DO is maintained at greater than 1 mg/L in the aerated portion of the reactor; however, the aerobic and anoxic fractions within the reactor change to meet the ammonia set point goal. In other words, the aerobic SRT is controlled by the ammonia set point goal, which is achieved by changing aerobic and anoxic HRT through the use of swing zones. The total SRT is controlled aggressively so that at least 50% of the total HRT is aerobic at DO concentration of greater than 1 mg/L. The total SRT can also be controlled automatically by maintaining the waste flow rate based on aerobic HRT over a certain averaging time.

Similar to the aeration control in time, the desired aerobic and anoxic HRTs are achieved in this control method based on a predetermined ammonia set point concentration. If ammonia concentration is greater than the ammonia set point, the aerobic HRT is increased at 4 minute (adjustable) increments, waiting 60 seconds (adjustable) between increases in the aerobic HRT. If ammonia concentration is lower than the ammonia set point, the anoxic HRT is increased at 4 minute (adjustable) increments, waiting 60 seconds (adjustable) between increases in the anoxic HRT.

Figure 14:
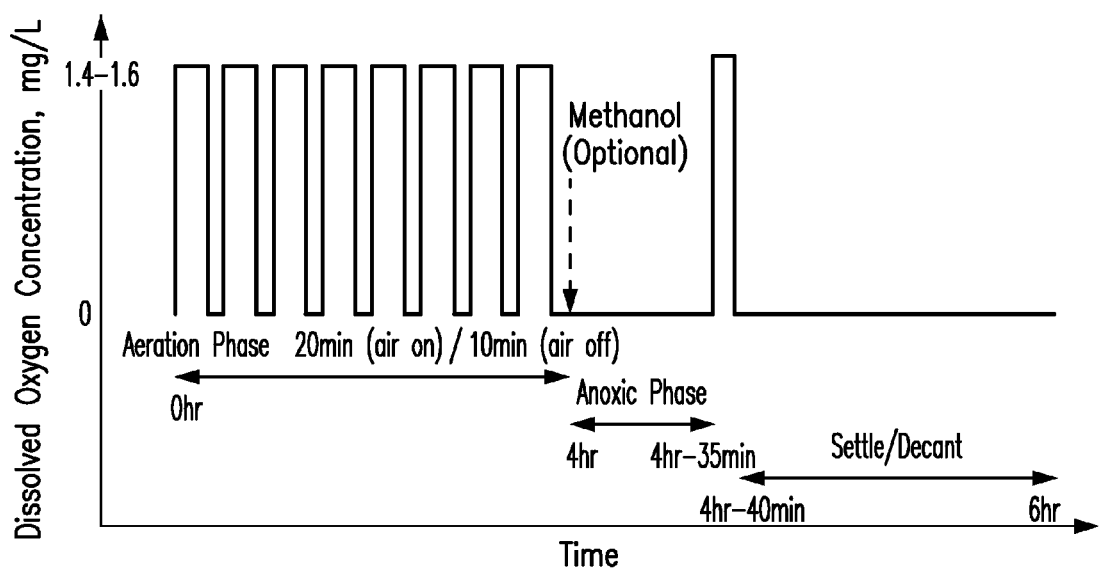
FIG. 14 is a graph showing SBR aeration control for intermittent aeration configuration. [The numerical values in this figure are specific to this particular aeration scenario and are not to be used as general recommendation].

Control Strategy C:

This strategy entails achieving intermittent aeration in a reactor with the use of predetermined ammonia set points. The reactor is equipped with a mixer and an air diffuser to achieve anoxic mixing and aeration. Under this approach, operational DO is set at greater than 1 mg/L when the reactor is aerated. FIG. 14. illustrates an example of this operation mode in an SBR system. The duration of aeration is controlled based on the high and low ammonia set points. When the ammonia concentration in the reactor is more than the ammonia set point, the reactor will be aerated until the low ammonia set point is reached. As soon as reactor ammonia concentration is lower than the low ammonia set point, reactor aeration is terminated (mixing is provided), such that the ammonia concentration is allowed to fluctuate within this bandwidth with continuously alternating between aerobic and anoxic conditions.

RELEVANT ACRONYMS

AOB: ammonia oxidizing bacteria
AeZ: aerobic zone;
AnZ: anaerobic zone;
BNR: biological nutrient removal
COD: chemical oxygen demand
DO: dissolved oxygen
FA: free ammonia
HDO: high DO
$HNH_3$—N: high ammonia-N setpoint
HRT: hydraulic residence time
IFAS: integrated fixed-film sludge
LDO: low DO
$LNH_3$—N: low ammonia-N setpoint
MBBR: moving bed biofilm reactor
NOB: nitrite oxidizing bacteria
OUR: oxygen uptake rate
PE: primary treated effluent
SE: secondary treated effluent
ScBNR: short-cut biological nitrogen removal
SRT: solids retention time
SZ: swing zone
TAF: Transient Anoxia Frequency
WWTP: Waste Water Treatment Plant

DOCUMENTS CITED IN APPLICATION

U.S. Patent Documents

2010/0233777 A1 September 2010 Chandran et al
U.S. Pat. No. 6,485,646 B1 November 2002 Dijkman et al.
2011/0198284 A1 August 2011 Nyhuis
2011/0253625A1 October 2011 Takeda et al.
U.S. Pat. No. 7,846,334 B2 December 2010 Wett
U.S. Pat. No. 6,602,417 B1 August 2003 Zilvertant
U.S. Pat. No. 7,404,897 B2 July 2008 Bailey, Jr. et al.

Foreign Patent Documents

| EP | 0931768B1 | September 2003 |
| EP | 0826639A1 | March 1998 |
| EP | 0872451B1 | December 2002 |
| EP | 216352481 | September 2008 |
| WO | 2006/129132A1 | December 2006 |
| WO | 2012/052443A1 | April 2012 |
| WO | 00370A1 | January 1998 |

Other Publications

Abeling and Seyfried (1992) Water Science and Technology 26(5-6): 1007-1015.
Alleman and Irvine (1980) Water Research 14: 1483-1488.
Anthonisen et al. (1976) Journal of Water Pollution Control Federation 48: 835-852.
Bernet et al. (2001) Journal of Environmental Engineering 127: 266-271.
Blackburne et al. (2008) Biodegradation 19(2): 303-312.
Ciudad et al. (2005) Process Biochemistry 40(5): 1715-1719.
Daebel et al. (2007) Water Research 41: 1094-1102.
Fux et al. (2002) Journal Biotechnology 99(3): 295-306.
Gao et al. (2009) Bioresource Technology 100: 2298-2300.
Gee and Kim (2004) Water Science and Technology 49: 47-55.
Hanaki et al. (1990) Water Research 24: 297-302.
Helling a et al. (1998) Water Science and Technology 37(9): 135-142.
Hippen et al. (1997) Water Science and Technology 35 (10): 111-120.
Ju et al. (2007) Water Environment Research 79(8): 912-920.
Katsogiannis et al. (2003) Water Science and Technology 47(11): 53-59.
Kim et al. (2008) Process Biochemistry 43(2): 154-160.
Kornaros and Dokianakis (2010) Environmental Science and Technology 44: 7245-7253.
Laanbroek and Gerards (1993) Archives of Microbiology 159: 453-459.
Lemaire et al. (2008) Biotechnology and Bioengineering 100 (6): 1228-1236.
Li et al. (2012) Process Safety and Environmental Protection. doi:10.1016/j.psep.2012.05.009
Ling (2009) Proceedings of 2nd IWA specialized Conference on nutrient Management in Wastewater treatment Processes pp. 403-410.
Manser et al. (2005) Water Research 39(19): 4633-4642.
Monod (1949) Annual Review of Microbiology 3: 371.
Parker, D. and Wanner, J. (2007) Water Practice 1(5): 1-16
Peng et al. (2004) Water Science and Technology 50(10): 35-43.
Peng et al. (2007) Chinese Journal of Chemical Engineering 15(1): 115-121.
Pollice et al. (2002) Water Research 36(10): 2541-2546.
Sedlak (1991) Phosphorus and Nitrogen Removal from Municipal Wastewater: Principles and Practice (2nd ed.).
Rosenwinkel et al. (2005) Proceedings of IWA specialised Conference on nutrient Management in Wastewater treatment Processes and Recycle streams pp. 483-491.
Silverstein and Schroeder (1983) Journal of Water Pollution Control Federation 55: 377-384.
Sin et al. (2008) Water Science and Technology 58(6): 1155-1171.
Sliekers et al. (2005) Applied Microbial Biotechnology 68: 808-817.
Turk and Mavinic (1989) Water Research 23: 1383-1388.
Turk and Mavinic (1986) Canadian Journal of Civil Engineering 13: 600-605.
van Dongen et al. (2001) Water Science and Technology 44(1): 153-160.
Wett (2006) Water Science and Technology 53(12): 121-128.
Wett (2007) Water Science and Technology 56(7): 81-88.
Wett (2010) Water Science and Technology 61(8): 1915-1922.
Wong-Chong and Loehr (1978) Water Research 12(8): 605-609.

Wyffels et al. (2004) Water Science and Technology 49(5-6): 57-64.
Yang and Yang (2011) Journal of Hazardous Materials 195: 318-323.
Yoo et al. (1999) Water Research 33: 145-154.
Yu et al. (2000) Journal of Environmental Engineering 126: 943-948.
Zekker et al. (2012) Environmental Technology 33(4-6): 703-710.
Zeng et al. (2008) Chemical Engineering and Technology 31(4): 582-587.
Zeng et al. (2009) Enzyme and Microbial Technology 45(3): 226-232.

The invention claimed is:

1. A wastewater treatment apparatus, comprising:
a biological nitrogen removal (BNR) reactor having a volume;
an ammonia sensor for generating an ammonia concentration signal;
a mechanical mixer configured to mix at least a portion of the BNR reactor volume;
an aeration system configured to aerate at least a portion of the BNR reactor volume; and
a controller for processing the ammonia concentration signal and for thereby causing out-selection of nitrite oxidizing bacteria (NOB) under controlled transient anoxia conditions;
wherein the controller adjusts an aerobic solids retention time (SRT) by adjusting an aerobic hydraulic residence time (HRT) and an anoxic HRT through the use of at least one swing zone or through the manipulation of a dissolved oxygen concentration by adjustment of aeration intensity; and
wherein the controller increases the aerobic HRT when a measured ammonia concentration is greater than a predetermined ammonia setpoint in more than 75% of the reactor volume, and the anoxic HRT is increased when the measured ammonia concentration is lower than the predetermined ammonia setpoint in more than 75% of the reactor volume.

2. The apparatus of claim 1, wherein the controller can further adjust the aerobic HRT and the anoxic HRT by turning the mechanical mixer and the aeration system on or off.

3. The apparatus of claim 1, wherein the controller increases the aerobic HRT in four minute increments, waiting about one minute between increases, when the measured ammonia concentration is greater than the predetermined ammonia setpoint.

4. The apparatus of claim 1, wherein the controller increases the anoxic HRT in four minute increments, waiting about one minute between increases, when the measured ammonia concentration is lower than the predetermined ammonia setpoint.

5. The apparatus of claim 1, wherein the predetermined ammonia setpoint is between 1-4 mg/L.

6. The apparatus of claim 5, wherein the predetermined ammonia setpoint is about 1.5 mg/L.

7. A wastewater treatment method comprising:
providing a biological nitrogen removal (BNR) reactor having a volume;
mechanically mixing at least a portion of the BNR reactor;
aerating at least a portion of the BNR reactor volume;
generating an ammonia concentration signal using an ammonia sensor;
using a controller to process the ammonia concentration signal and thereby cause out-selection of nitrite oxidizing bacteria (NOB) under controlled transient anoxia conditions;
using a controller to adjust an aerobic solids retention time (SRT) by adjusting an aerobic hydraulic residence time (HRT) and an anoxic HRT by using at least one swing zone or through the manipulation of a dissolved oxygen concentration by adjustment of aeration intensity;
increasing the aerobic HRT when a measured ammonia concentration is greater than a predetermined ammonia setpoint in more than 75% of the reactor volume; and
increasing the anoxic HRT when the measured ammonia concentration is lower than the predetermined ammonia setpoint in more than 75% of the reactor volume.

8. The method of claim 7, further comprising:
increasing the aerobic HRT in four minute increments and waiting about one minute between increases when the measured ammonia concentration is greater than the predetermined ammonia setpoint.

9. The method of claim 7, further comprising:
increasing the anoxic HRT in four minute increments and waiting about one minute between increases when the measured ammonia concentration is greater than the predetermined ammonia setpoint.

10. The method of claim 7, further comprising:
adjusting the aerobic HRT and anoxic HRT by turning the mechanical mixing and aerating on or off.

11. The method of claim 7, wherein the predetermined ammonia setpoint is between 1-4 mg/L.

12. The method of claim 11, wherein the predetermined ammonia setpoint is about 1.5 mg/L.

* * * * *